United States Patent
Agrawal et al.

(10) Patent No.: US 8,599,705 B2
(45) Date of Patent: Dec. 3, 2013

(54) INTERFERENCE MANAGEMENT BASED ON ENHANCED PILOT MEASUREMENT REPORTS

(75) Inventors: Avneesh Agrawal, San Diego, CA (US); Aamod D. Khandekar, San Diego, CA (US); Naga Bhushan, San Diego, CA (US); Alexei Y. Gorokhov, San Diego, CA (US); Ravi Palanki, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 176 days.

(21) Appl. No.: 12/359,612

(22) Filed: Jan. 26, 2009

(65) Prior Publication Data

US 2010/0039948 A1 Feb. 18, 2010

Related U.S. Application Data

(60) Provisional application No. 61/025,644, filed on Feb. 1, 2008.

(51) Int. Cl.
*H04L 1/00* (2006.01)
*H04W 4/00* (2009.01)

(52) U.S. Cl.
USPC .......................................... 370/252; 370/329

(58) Field of Classification Search
USPC .................................................. 370/252, 329
See application file for complete search history.

(56) References Cited

U.S. PATENT DOCUMENTS

| | | | |
|---|---|---|---|
| 3,916,112 A | 10/1975 | Kalat et al. | |
| 4,001,784 A | 1/1977 | Bardotti et al. | |
| 5,437,056 A | 7/1995 | Rautiola | |
| 5,530,917 A | 6/1996 | Andersson et al. | |

(Continued)

FOREIGN PATENT DOCUMENTS

| | | |
|---|---|---|
| CN | 1520648 A | 8/2004 |
| EP | 1091503 A2 | 4/2001 |

(Continued)

OTHER PUBLICATIONS

International Search Report and Written Opinion—PCT/US2009/032161, International Search Authority—European Patent Office—Jun. 25, 2009.

(Continued)

*Primary Examiner* — Mark Rinehart
*Assistant Examiner* — Angel Brockman
(74) *Attorney, Agent, or Firm* — Kam T. Tam

(57) ABSTRACT

Techniques for managing interference in a wireless network are described. A base station may receive enhanced pilot measurement reports from user equipments (UEs) and may make an interference management decision based on the received reports. The base station may select a serving base station for a UE based on an enhanced pilot measurement report received from the UE. The base station may determine resources with a low target interference level at a neighbor base station and may avoid scheduling a UE for uplink transmission on the resources. The base station may also determine whether to reserve resources for a neighbor base station based on data performance of the neighbor base station, whether the neighbor base station observes high interference from UEs served by the base station, or whether UEs served by the neighbor base station observe high interference from the base station, which may be determined based on the enhanced pilot measurement reports.

35 Claims, 7 Drawing Sheets

(56) References Cited

U.S. PATENT DOCUMENTS

| | | |
|---|---|---|
| 5,715,516 A | 2/1998 | Howard et al. |
| 5,828,963 A | 10/1998 | Grandhi et al. |
| 5,995,496 A | 11/1999 | Honkasalo et al. |
| 6,078,817 A | 6/2000 | Rahman |
| 6,088,335 A * | 7/2000 | I et al. ............... 370/252 |
| 6,167,240 A | 12/2000 | Carlsson et al. |
| 6,236,365 B1 | 5/2001 | LeBlanc et al. |
| 6,278,701 B1 | 8/2001 | Ayyagari et al. |
| 6,330,459 B1 | 12/2001 | Crichton et al. |
| 6,374,112 B1 | 4/2002 | Widegren et al. |
| 6,418,148 B1 | 7/2002 | Kumar et al. |
| 6,442,150 B1 * | 8/2002 | Kondo et al. ............. 370/331 |
| 6,463,290 B1 | 10/2002 | Stilp et al. |
| 6,463,296 B1 | 10/2002 | Esmailzadeh et al. |
| 6,466,088 B1 | 10/2002 | Rezvani et al. |
| 6,519,465 B2 | 2/2003 | Stilp et al. |
| 6,711,403 B1 | 3/2004 | Herrmann et al. |
| 6,792,284 B1 | 9/2004 | Dalsgaard et al. |
| 6,845,088 B2 | 1/2005 | Terry et al. |
| 6,889,048 B1 | 5/2005 | Koo |
| 6,952,181 B2 | 10/2005 | Karr et al. |
| 6,968,186 B2 * | 11/2005 | Pittampalli et al. ........ 455/422.1 |
| 7,092,371 B2 | 8/2006 | Terry et al. |
| 7,103,364 B2 | 9/2006 | Ishikawa et al. |
| 7,130,637 B2 | 10/2006 | Fisher |
| 7,146,133 B2 | 12/2006 | Bahl et al. |
| 7,190,700 B2 | 3/2007 | Choi |
| 7,212,826 B2 | 5/2007 | Fisher |
| 7,283,494 B2 | 10/2007 | Hammel et al. |
| 7,313,117 B2 | 12/2007 | Terry et al. |
| 7,327,697 B1 | 2/2008 | Friday et al. |
| 7,346,034 B2 | 3/2008 | Takano et al. |
| 7,373,162 B2 | 5/2008 | Farnham et al. |
| 7,379,755 B2 | 5/2008 | Nakayasu |
| 7,403,780 B2 | 7/2008 | VanLaningham et al. |
| 7,423,991 B2 | 9/2008 | Cho et al. |
| 7,426,395 B2 | 9/2008 | Stephens |
| 7,453,861 B2 | 11/2008 | Leung et al. |
| 7,454,222 B2 | 11/2008 | Huang et al. |
| 7,512,411 B2 | 3/2009 | Moon et al. |
| 7,532,609 B2 | 5/2009 | Gross et al. |
| 7,586,888 B2 | 9/2009 | Wang |
| 7,593,356 B1 | 9/2009 | Friday et al. |
| 7,602,761 B2 | 10/2009 | Lin et al. |
| 7,623,879 B2 | 11/2009 | Honkanen et al. |
| 7,630,736 B2 | 12/2009 | Wang |
| 7,639,610 B2 | 12/2009 | Yang et al. |
| 7,715,430 B2 | 5/2010 | Ranta-Aho et al. |
| 7,720,485 B2 | 5/2010 | Jin et al. |
| 7,734,269 B2 | 6/2010 | Komulainen et al. |
| 7,756,041 B2 | 7/2010 | Whitehill et al. |
| 7,756,520 B2 | 7/2010 | Hashem et al. |
| 7,756,523 B2 | 7/2010 | Ebata |
| 7,760,644 B2 | 7/2010 | Bader |
| 7,778,151 B2 | 8/2010 | Bertrand et al. |
| 7,801,058 B2 | 9/2010 | Wang |
| 7,812,766 B2 | 10/2010 | Leblanc et al. |
| 7,817,997 B2 | 10/2010 | Nylander et al. |
| 7,826,796 B2 | 11/2010 | Matsunaga |
| 7,830,795 B2 | 11/2010 | Zimmerman et al. |
| 7,844,277 B2 | 11/2010 | Cheng et al. |
| 7,860,052 B2 | 12/2010 | Lohr et al. |
| 7,869,378 B2 | 1/2011 | Livet et al. |
| 7,869,801 B2 | 1/2011 | Goodjohn |
| 7,903,616 B2 | 3/2011 | Terry et al. |
| 7,912,021 B2 | 3/2011 | Barbaresi et al. |
| 7,912,081 B2 | 3/2011 | Heidari-Bateni et al. |
| 7,920,888 B2 | 4/2011 | Beming et al. |
| 7,924,794 B2 | 4/2011 | Ballarini et al. |
| 7,961,702 B2 | 6/2011 | Salonidis et al. |
| 7,991,413 B2 | 8/2011 | Honkanen et al. |
| 8,005,046 B2 | 8/2011 | Salmenkaita et al. |
| 8,005,482 B2 | 8/2011 | Tolli et al. |
| 8,009,562 B2 | 8/2011 | Rayment et al. |
| 8,031,686 B2 | 10/2011 | Li et al. |
| 8,045,987 B2 | 10/2011 | Rudolf et al. |
| 8,050,222 B2 | 11/2011 | Maeda et al. |
| 8,068,785 B2 | 11/2011 | Ahn et al. |
| 8,072,929 B2 | 12/2011 | Frederiksen et al. |
| 8,077,640 B2 | 12/2011 | Li et al. |
| 8,099,099 B2 | 1/2012 | Laroia et al. |
| 8,099,504 B2 | 1/2012 | Cherian et al. |
| 8,107,962 B2 | 1/2012 | Parmar et al. |
| 8,107,964 B2 | 1/2012 | Nylander et al. |
| 8,145,221 B2 | 3/2012 | Garg et al. |
| 8,169,957 B2 | 5/2012 | Damnjanovic |
| 8,200,221 B2 | 6/2012 | Tolli et al. |
| 8,200,229 B2 | 6/2012 | Kaikkonen et al. |
| 8,218,504 B2 | 7/2012 | Yamamoto et al. |
| 8,243,667 B2 | 8/2012 | Chun et al. |
| 8,266,240 B2 | 9/2012 | Marjelund et al. |
| 8,279,824 B2 | 10/2012 | Chun et al. |
| 8,351,370 B2 | 1/2013 | Kim et al. |
| 8,351,949 B2 | 1/2013 | Fu |
| 8,385,294 B2 | 2/2013 | Ben-Eli |
| 2003/0210665 A1 | 11/2003 | Salmenkaita et al. |
| 2004/0053630 A1 * | 3/2004 | Ramos et al. ............... 455/500 |
| 2004/0127259 A1 | 7/2004 | Matsunaga |
| 2005/0143084 A1 * | 6/2005 | Cheng et al. ............. 455/452.2 |
| 2006/0092881 A1 * | 5/2006 | Laroia et al. ............... 370/331 |
| 2006/0206912 A1 | 9/2006 | Klarfeld et al. |
| 2006/0212904 A1 | 9/2006 | Klarfeld et al. |
| 2006/0234702 A1 | 10/2006 | Wiberg et al. |
| 2006/0281462 A1 * | 12/2006 | Kim et al. ............... 455/436 |
| 2007/0037523 A1 | 2/2007 | Bi et al. |
| 2007/0060057 A1 | 3/2007 | Matsuo et al. |
| 2007/0082619 A1 | 4/2007 | Zhang et al. |
| 2007/0082620 A1 | 4/2007 | Zhang et al. |
| 2007/0099618 A1 * | 5/2007 | Kim ............... 455/436 |
| 2007/0105559 A1 | 5/2007 | Dillon et al. |
| 2007/0124494 A1 | 5/2007 | Harris |
| 2007/0168326 A1 | 7/2007 | Das et al. |
| 2007/0207828 A1 | 9/2007 | Cheng et al. |
| 2007/0243878 A1 | 10/2007 | Taira et al. |
| 2007/0253366 A1 | 11/2007 | Gabin et al. |
| 2007/0280096 A1 | 12/2007 | Yanover et al. |
| 2008/0008147 A1 | 1/2008 | Nakayama |
| 2008/0032731 A1 * | 2/2008 | Shen et al. ............... 455/522 |
| 2008/0057932 A1 * | 3/2008 | Brunner ............... 455/422.1 |
| 2008/0082981 A1 | 4/2008 | Kawaguchi et al. |
| 2008/0089312 A1 * | 4/2008 | Malladi ............... 370/345 |
| 2008/0133995 A1 | 6/2008 | Lohr et al. |
| 2008/0151832 A1 | 6/2008 | Iwasaki |
| 2008/0171565 A1 | 7/2008 | Shan et al. |
| 2008/0198785 A1 * | 8/2008 | Huang et al. ............... 370/312 |
| 2008/0233963 A1 | 9/2008 | Alanara et al. |
| 2008/0260000 A1 * | 10/2008 | Periyalwar et al. ............ 375/133 |
| 2008/0268833 A1 | 10/2008 | Huang et al. |
| 2009/0046632 A1 | 2/2009 | Nanda et al. |
| 2009/0047931 A1 | 2/2009 | Nanda et al. |
| 2009/0080386 A1 | 3/2009 | Yavuz et al. |
| 2009/0080499 A1 | 3/2009 | Yavuz et al. |
| 2009/0081970 A1 | 3/2009 | Yavuz et al. |
| 2009/0082026 A1 | 3/2009 | Yavuz et al. |
| 2009/0082027 A1 | 3/2009 | Yavuz et al. |
| 2009/0086861 A1 | 4/2009 | Yavuz et al. |
| 2009/0092118 A1 * | 4/2009 | Fu ............... 370/252 |
| 2009/0117933 A1 | 5/2009 | Umesh et al. |
| 2009/0130980 A1 | 5/2009 | Palanki et al. |
| 2009/0132674 A1 | 5/2009 | Horn et al. |
| 2009/0132675 A1 | 5/2009 | Horn et al. |
| 2009/0135754 A1 | 5/2009 | Yavuz et al. |
| 2009/0135790 A1 | 5/2009 | Yavuz et al. |
| 2009/0135796 A1 | 5/2009 | Nanda et al. |
| 2009/0137221 A1 | 5/2009 | Nanda et al. |
| 2009/0137241 A1 | 5/2009 | Yavuz et al. |
| 2009/0143016 A1 | 6/2009 | Li |
| 2009/0147748 A1 | 6/2009 | Ofuji et al. |
| 2009/0168800 A1 | 7/2009 | Leinonen et al. |
| 2009/0180435 A1 | 7/2009 | Sarkar |
| 2009/0197538 A1 | 8/2009 | Borran et al. |
| 2009/0197588 A1 | 8/2009 | Khandekar et al. |
| 2009/0197590 A1 | 8/2009 | Borran et al. |
| 2009/0197629 A1 | 8/2009 | Borran et al. |

| | | |
|---|---|---|
| 2009/0197631 A1 | 8/2009 | Palanki et al. |
| 2009/0227263 A1 | 9/2009 | Agrawal et al. |
| 2009/0252099 A1 | 10/2009 | Black et al. |
| 2009/0296647 A1 | 12/2009 | Friday et al. |
| 2010/0202305 A1 | 8/2010 | Wijting et al. |
| 2010/0202380 A1 | 8/2010 | Park et al. |
| 2010/0211540 A9 | 8/2010 | Das et al. |
| 2010/0240387 A1 | 9/2010 | Ezaki |
| 2010/0322160 A1 | 12/2010 | Yeh et al. |
| 2011/0082881 A1 | 4/2011 | Chunilal |
| 2011/0149915 A1 | 6/2011 | Terry et al. |
| 2011/0244887 A1 | 10/2011 | Dupray et al. |
| 2011/0255515 A1 | 10/2011 | Maeda et al. |
| 2012/0026896 A1 | 2/2012 | Li et al. |

FOREIGN PATENT DOCUMENTS

| | | |
|---|---|---|
| EP | 1353455 A1 | 10/2003 |
| EP | 1434364 A2 | 6/2004 |
| EP | 1936829 A1 | 6/2008 |
| JP | 8107382 A | 4/1996 |
| JP | 2006340008 A | 12/2006 |
| JP | 2008017325 A | 1/2008 |
| RU | 2004117213 | 3/2005 |
| WO | WO9854853 A1 | 12/1998 |
| WO | WO9905878 A1 | 2/1999 |
| WO | WO0028758 A1 | 5/2000 |
| WO | WO02093575 A2 | 11/2002 |
| WO | WO03041287 | 5/2003 |
| WO | WO2006044718 | 4/2006 |
| WO | WO2007047669 | 4/2007 |
| WO | WO2007051140 | 5/2007 |
| WO | WO02103920 A2 | 12/2007 |
| WO | WO2008120159 A2 | 10/2008 |
| WO | WO2009052754 A1 | 4/2009 |

OTHER PUBLICATIONS

Nortel: "Adaptive Fractional Frequency Reuse", 3GPP Draft; R1-062150,3RD Generation Partnership Project (3GPP), Mobile Competence Centre ; 650, Route Des Lucioles ; F-06921 Sophia-Antipolis Cedex ; France, vol. RAN WGl, no. Tallinn; 20060823, Aug. 23, 2006.

Taiwan Search Report—TW098103320—TIPO—Feb. 28, 2012.

* cited by examiner

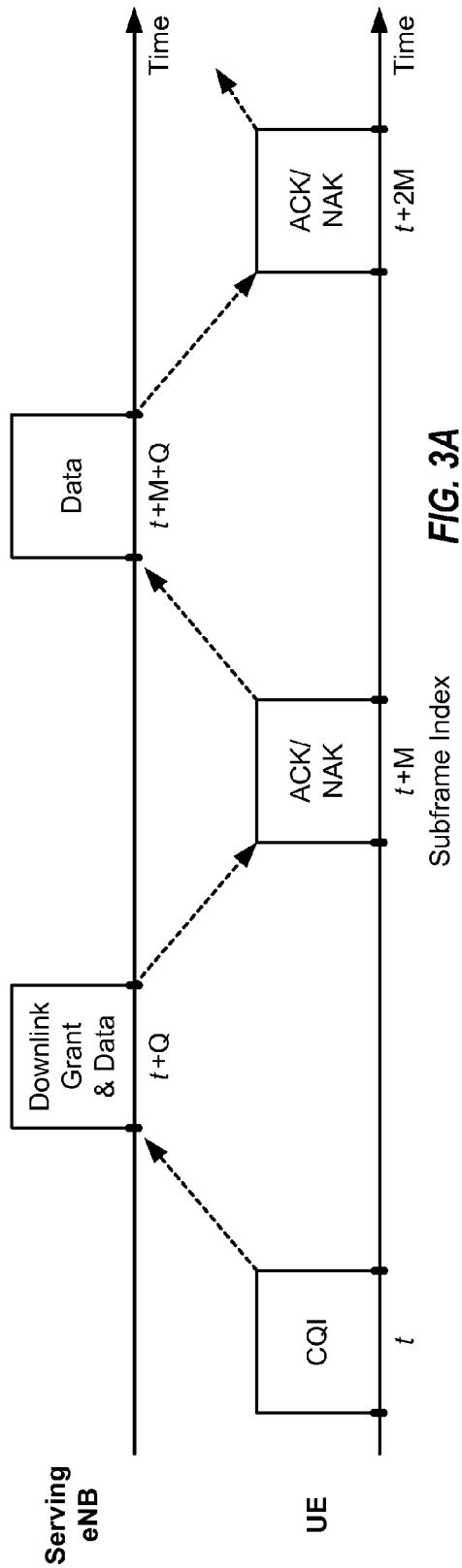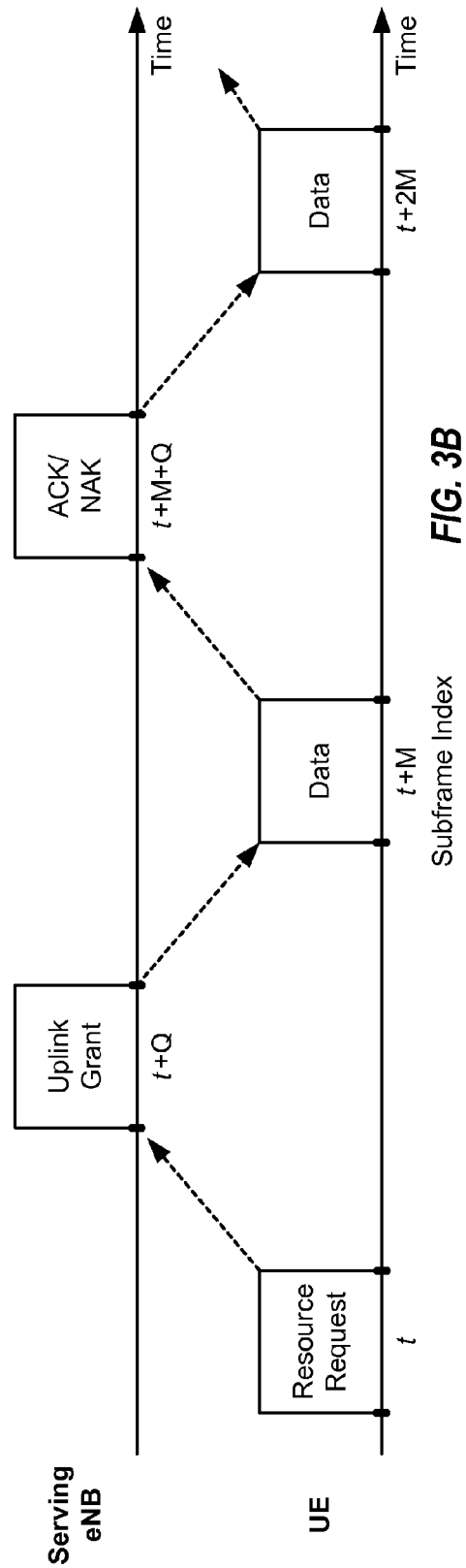

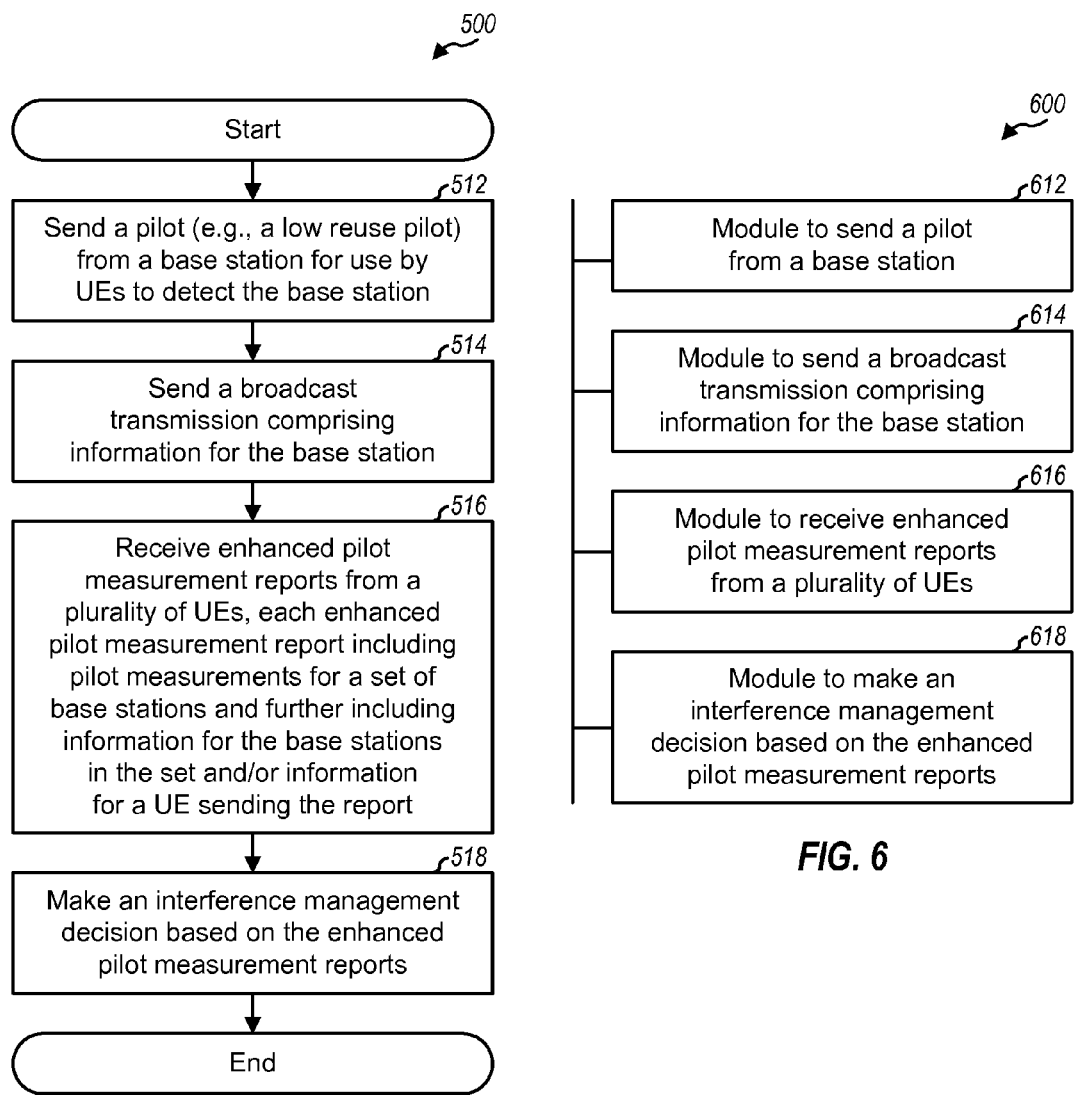

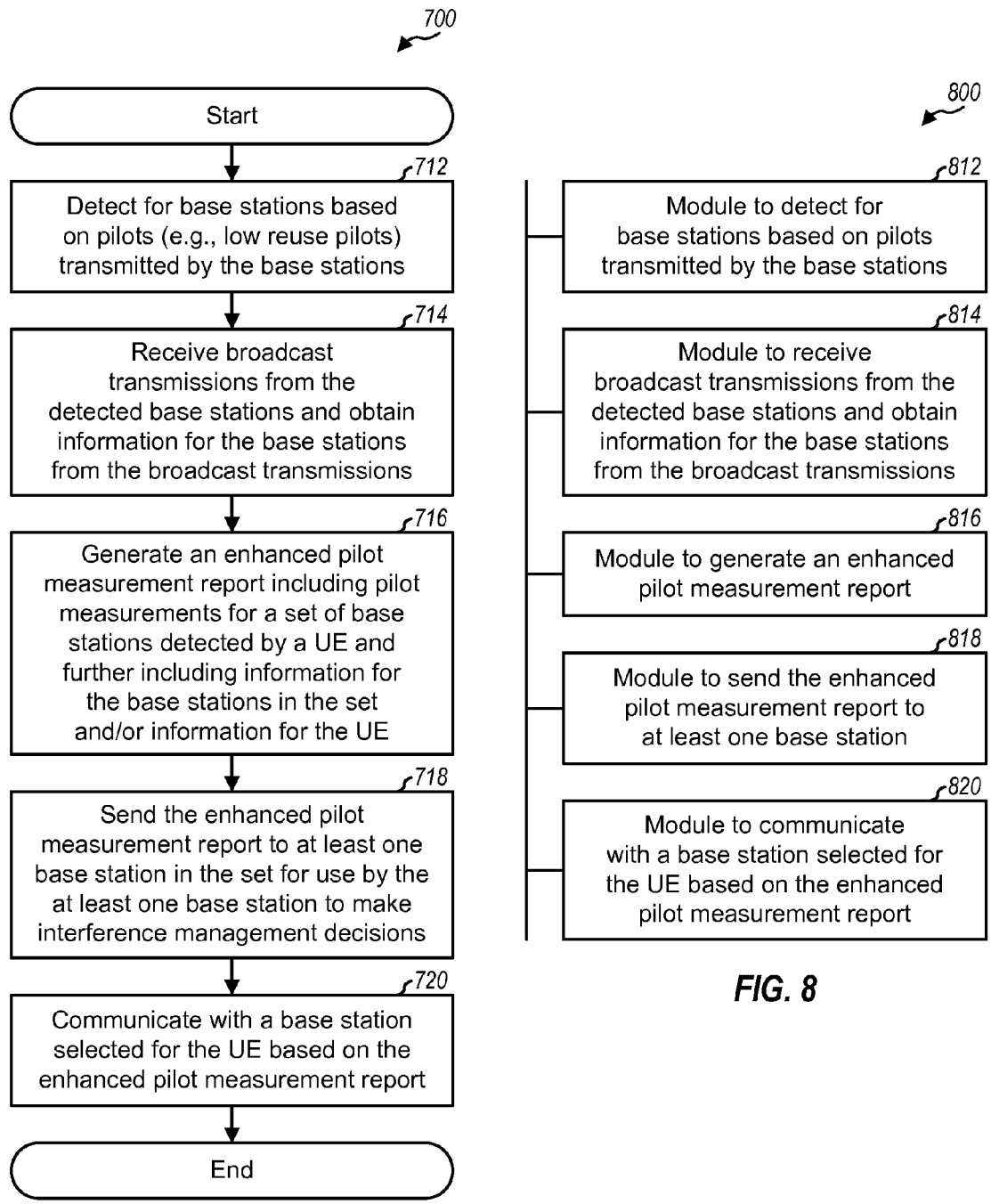

INTERFERENCE MANAGEMENT BASED ON ENHANCED PILOT MEASUREMENT REPORTS

The present application claims priority to provisional U.S. Application Ser. No. 61/025,644, entitled "INTERFERENCE AVOIDANCE," filed Feb. 1, 2008, assigned to the assignee hereof and incorporated herein by reference.

BACKGROUND

I. Field

The present disclosure relates generally to communication, and more specifically to techniques for managing interference in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data to UEs on the downlink and/or may receive data from the UEs on the uplink. The UEs may observe high interference from neighbor base stations on the downlink and may cause high interference to the neighbor base stations on the uplink. High interference on each link may degrade performance.

There is therefore a need in the art for techniques to manage interference in a wireless network.

SUMMARY

Techniques for managing interference in a wireless communication network are described herein. In an aspect, a base station may make interference management decisions based on enhanced pilot measurement reports received from UEs. An enhanced pilot measurement report is a report or message including pilot measurements for base stations detected by a UE as well as additional information that might be useful for interference management. The additional information may include information for the base stations being reported, information for the UE sending the report, etc. An interference management decision is a decision regarding resource allocation or scheduling that is intended to reduce interference to one or more base stations, which may improve network performance.

In one design, a base station may send a pilot (e.g., a low reuse pilot) for use by UEs to detect the base station. The base station may also send a broadcast transmission comprising information for the base station. This information may include various parameters and may be used for enhanced pilot measurement reports. The base station may receive enhanced pilot measurement reports from a plurality of UEs and may make an interference management decision based on the received reports. In one design, the base station may select a serving base station for a UE based on an enhanced pilot measurement report received from the UE. In another design, the base station may determine resources with a low target interference level at a neighbor base station and may avoid scheduling a UE for uplink transmission on the resources in order to reduce interference to the neighbor base station. In yet another design, the base station may determine whether to reserve resources for a neighbor base station based on the enhanced pilot measurement reports. For example, the base station may determine data performance of the neighbor base station, whether the neighbor base station observes high interference from UEs served by the base station, whether UEs served by the neighbor base station observe high interference from the base station, etc. based on information in the received reports and may reserve resources for the neighbor base station accordingly.

Various aspects and features of the disclosure are described in further detail below.

BRIEF DESCRIPTION OF THE DRAWINGS

FIG. 3A shows an example of data transmission on the downlink.

FIG. 3B shows an example of data transmission on the uplink.

FIG. 5 shows a process performed by a base station.

FIG. 6 shows an apparatus for a base station.

FIG. 7 shows a process performed by a UE.

FIG. 8 shows an apparatus for a UE.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
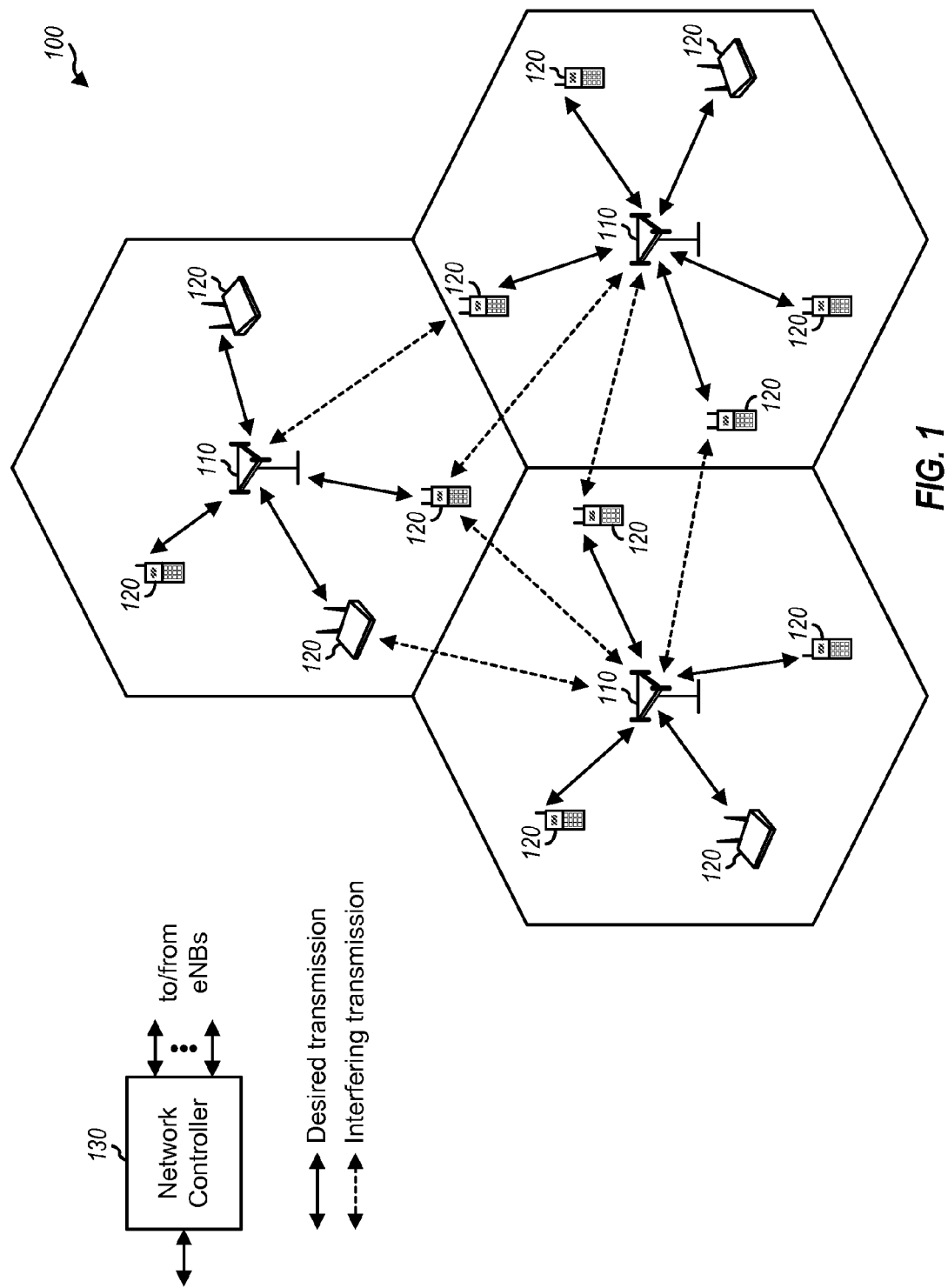
FIG. 1 shows a wireless communication network.

FIG. 1 shows a wireless communication network 100, which may be an LTE network or some other network. Wireless network 100 may include a number of evolved Node Bs (eNBs) 110 and other network entities. An eNB may be a station that communicates with the UEs and may also be referred to as a base station, a Node B, an access point, etc. Each eNB may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell, e.g., UEs belonging to a closed subscriber group (CSG). The CSG may include UEs for users in a home, UEs for users subscribing to a special service plan offered by a network operator, etc. An eNB for a macro cell may be referred to as a macro eNB. An eNB for a pico cell may be referred to as a pico eNB. An eNB for a femto cell may be referred to as a femto eNB or a home eNB.

Wireless network 100 may also include relay stations. A relay station is a station that receives a transmission of data and/or other information from an upstream station and sends a transmission of the data and/or other information to a downstream station. The upstream station may be an eNB, another relay station, or a UE. The downstream station may be a UE, another relay station, or an eNB.

A network controller 130 may couple to a set of eNBs and provide coordination and control for these eNBs. Network controller 130 may be a single network entity or a collection of network entities. Network controller 130 may communicate with eNBs 110 via a backhaul. eNBs 110 may also communicate with one another, e.g., directly or indirectly via wireless or wireline backhaul.

Wireless network 100 may be a homogeneous network that includes only macro eNBs. Wireless network 100 may also be a heterogeneous network that includes different types of eNBs, e.g., macro eNBs, pico eNBs, femto eNBs, etc. The techniques described herein may be used for homogeneous and heterogeneous networks.

UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, and/or other types of eNBs. In FIG. 1, a solid line with double arrows indicates desired transmissions between a UE and an eNB. A dashed line with double arrows indicates interfering transmissions between a UE and an eNB.

Figure 2:
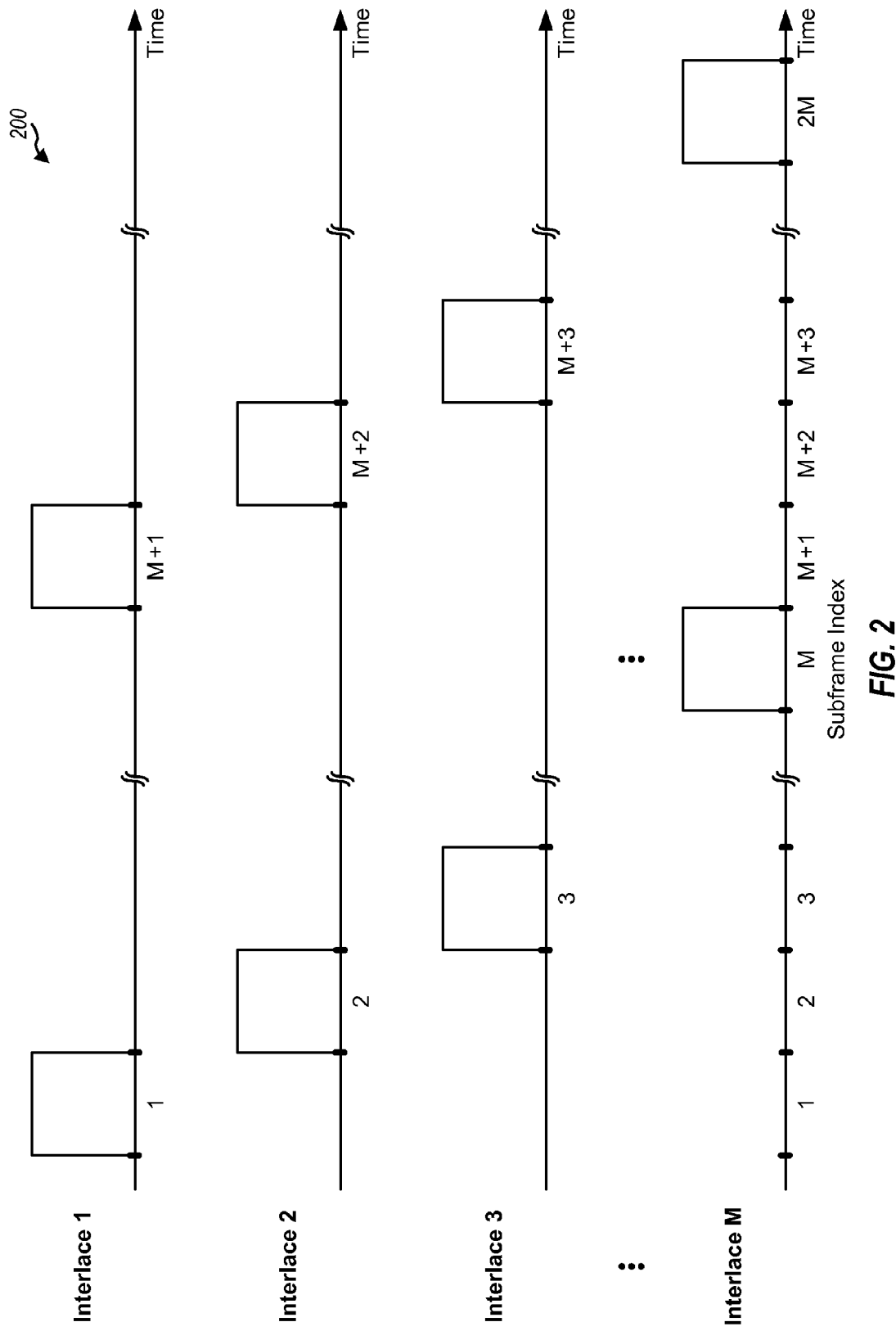
FIG. 2 shows an interlace transmission structure.

FIG. 2 shows an interlace transmission structure 200 that may be used for each of the downlink and uplink. The transmission timeline for each link may be partitioned into units of subframes, which may also be referred to as frames, slots, etc. Each subframe may cover a particular time duration, e.g., 1 milliseconds (ms).

M interlaces with indices of 1 through M may be defined for each link, where M may be equal to 4, 6, 8 or some other value. Each interlace may include subframes that are spaced apart by M subframes. For example, interlace 1 may include subframes 1, M+1, 2M+1, etc., interlace 2 may include subframes 2, M+2, 2M+2, etc. The interlaces for the downlink may be referred to as downlink interlaces, and the interlaces for the uplink may be referred to as uplink interlaces.

The downlink and uplink interlaces may be used for hybrid automatic retransmission (HARQ) and may also be referred to as HARQ interlaces. For HARQ, one or more transmissions of a packet may be sent until the packet is decoded correctly or some other termination condition is encountered. All transmissions of the packet may be sent in different subframes of a single interlace.

FIG. 3A shows an example of data transmission on the downlink. A UE may estimate the downlink channel quality for a serving eNB and may send channel quality indicator (CQI) information in subframe t. The serving eNB may use the CQI information and/or other information to schedule the UE for data transmission on the downlink and to select a modulation and coding scheme (MCS) for the UE. The serving eNB may send a downlink grant and data in subframe t+Q, where $1 \leq Q < M$. The downlink grant may include the selected MCS, the assigned resources, etc. The UE may process the data transmission from the serving eNB in accordance with the downlink grant and, depending on the decoding result, may send an acknowledgement (ACK) or a negative acknowledgement (NAK) in subframe t+M. The serving eNB may retransmit the data if a NAK is received and may transmit new data if an ACK is received. Data transmission on the downlink and ACK/NAK feedback on the uplink may continue in similar manner.

FIG. 3B shows an example of data transmission on the uplink. A UE may have data to send to a serving eNB and may send a resource request in subframe t. The serving eNB may schedule the UE for data transmission on the uplink and may send an uplink grant in subframe t+Q. The uplink grant may include the selected MCS, the assigned resources, etc. The UE may send data in accordance with the uplink grant in subframe t+M. The serving eNB may process the data transmission from the UE and, depending on the decoding result, may send an ACK or a NAK in subframe t+M+Q. The UE may retransmit the data if a NAK is received and may transmit new data if an ACK is received. Data transmission on the uplink and ACK/NAK feedback on the downlink may continue in similar manner.

As shown in FIG. 3A, data transmission on the downlink may be supported with a pair of downlink and uplink interlaces. As shown in FIG. 3B, data transmission on the uplink may be supported with a pair of downlink and uplink interlaces. Data transmission on both links may also be supported with a pair of interlaces.

Wireless network 100 may have a particular system bandwidth, which may be partitioned into a number of subbands. Each subband may cover a range of frequencies. The number of subbands may be dependent on the system bandwidth. For example, in LTE, each subband covers 1.08 MHz, and there may be 1, 2, 4, 8 or 16 subbands for system bandwidth of 1.25, 2.5, 5, 10 or 20 MHz, respectively. The system bandwidth may also be partitioned in other manners.

Wireless network 100 may include different types of eNBs, e.g., macro eNBs, pico eNBs, femto eNBs, etc. These different types of eNBs may transmit at different power levels, have different coverage areas, and have different impact on interference in wireless network 100. For example, macro eNBs may have a high transmit power level (e.g., 20 Watts) and may be referred to as high-power eNBs. Pico and femto eNBs may have a low transmit power level (e.g., 1 Watt) and may be referred to as low-power eNBs. Furthermore, some eNBs (e.g., femto eNBs) may be deployed in an unplanned manner. The different types of eNBs and/or unplanned deployment of eNBs may necessitate coordination among the eNBs in order to achieve good performance.

A UE may be within the coverage of multiple eNBs. One of these eNBs may be selected to serve the UE. The serving eNB may be selected based on various criteria such as received signal quality, received signal strength, pathloss, etc. Received signal quality may also be referred to as geometry and may be quantified by a signal-to-noise ratio (SNR), a signal-to-noise-and-interference ratio (SINR), a carrier-to-interference ratio (C/I), etc. Received signal strength may be quantified by received pilot power, etc.

A UE may operate in a dominant interference scenario in which the UE may observe high interference from one or more neighbor eNBs and/or may cause high interference to the neighbor eNB(s). High interference may be quantified by the observed interference exceeding a threshold or based on some other criteria. A dominant interference scenario may occur due to the UE connecting to an eNB with lower pathloss and lower geometry among all eNBs detected by the UE. This may be desirable if the selected eNB has much lower transmit power as compared to the other eNBs. Less interference may then be caused on both the downlink and uplink to achieve a given data rate for the UE. A dominant interference scenario may also occur due to restricted association. The UE may be close to an eNB with high received power but may not be allowed to access this eNB due to restricted association. The UE may then connect to an unrestricted eNB with lower received power. The UE may then observe high interference from the restricted eNB and may also cause high interference to this eNB.

In an aspect, an eNB may make interference management decisions based on enhanced pilot measurement reports received from UEs. The enhanced pilot measurement reports may include various types of information and may be sent in various manners, as described below. The eNB may make various interference management decisions based on the enhanced pilot measurement reports, as also described below.

Figure 4:
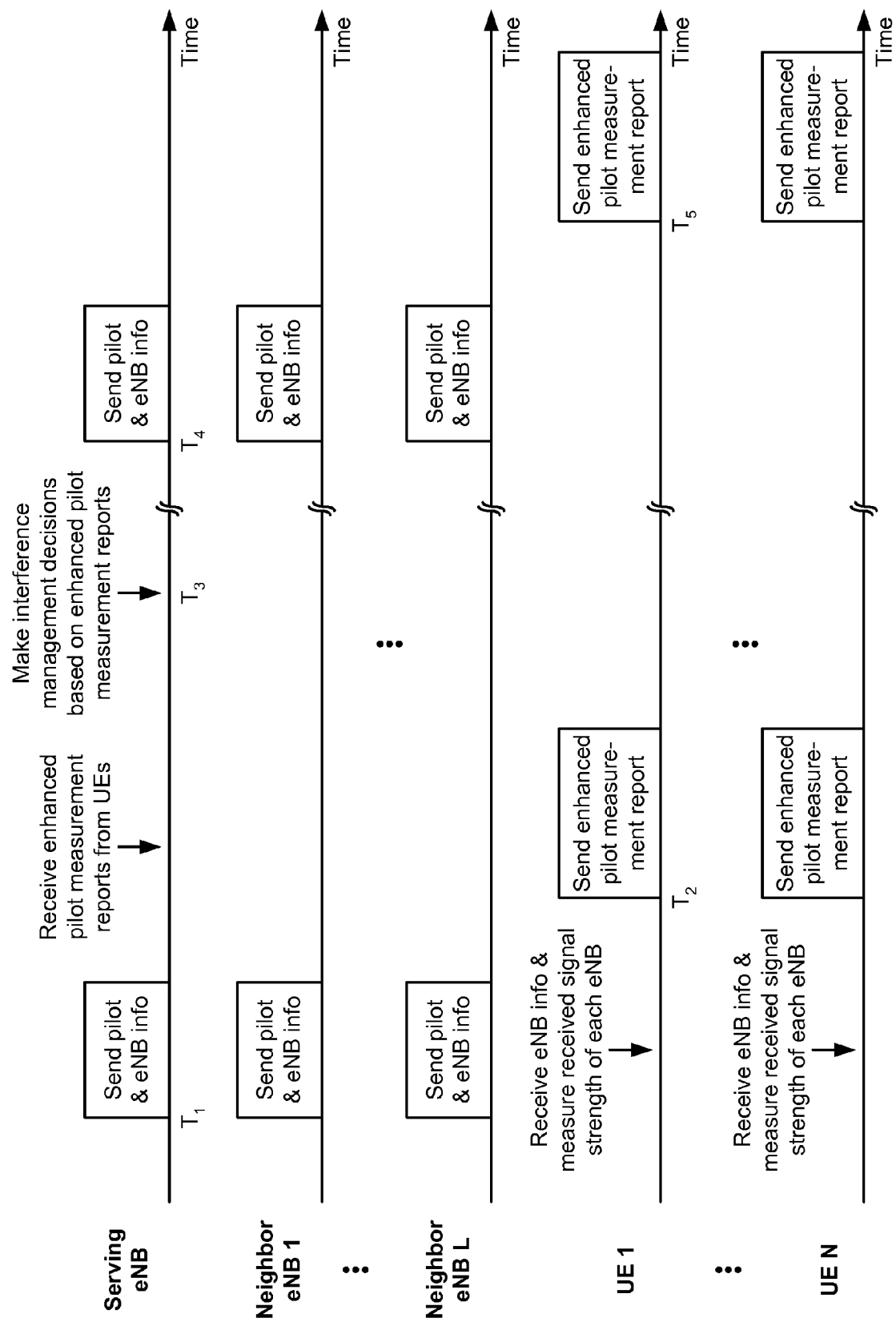
FIG. 4 shows a design of sending and using enhanced pilot measurement reports.

FIG. 4 shows a design of sending and using enhanced pilot measurement reports for interference management. A serving eNB and neighbor eNBs may periodically transmit pilots and eNB information on the downlink. The pilots may be low reuse pilots/preambles (LRPs) and/or other synchronization signals, reference signals, etc. An LRP is a pilot transmitted with low reuse and/or high power so that it can be detected even by distant UEs observing high interference on the downlink. Low reuse refers to different base stations using different resources (at least in part) for pilot transmission, thus improving pilot SNR by reducing interference and ensuring that even pilots of relatively weak base stations can be detected. The other synchronization signals may comprise a primary synchronization signal and a secondary synchronization signal in LTE. The eNB information may comprise various types of information for the eNBs, as described below. UEs within the coverage of the serving eNB and the neighbor eNBs may receive the pilots from these eNBs and make pilot measurements. A pilot measurement is a measurement based on a pilot and may comprise received signal strength (e.g., received pilot power), received signal quality (e.g., SNR), timing offset, etc. The UEs may generate enhanced pilot measurement reports containing pilot measurements, eNB information, UE information, etc. The serving eNB may receive the enhanced pilot measurement reports from the UEs and may make interference management decisions based on these reports. The serving eNB may also schedule its UEs based on the enhanced pilot measurement reports and other information. The neighbor eNBs may also receive the enhanced pilot measurement reports and may make interference management decisions based on these reports (not shown in FIG. 4 for simplicity).

The eNBs may periodically transmit pilots and eNB information. The transmissions from different eNBs may be time aligned (as shown in FIG. 4) or may be staggered across time. The UEs may send enhanced pilot measurement reports periodically (e.g., whenever pilots are received), when and as configured for pilot measurement reporting, whenever requested, etc. The enhanced pilot measurement reports from different UEs may be time aligned (as shown in FIG. 4) or may be staggered across time.

A given eNB X may broadcast eNB information, which may comprise various types of information regarding eNB X. In one design, the eNB information may include some or all of the following:

Transmit power level of the eNB,
Loading of the eNB,
Achieved data performance of the eNB,
Interference level observed on the uplink by the eNB,
Target interference level for the uplink for the eNB,
Number of transmit antennas for the eNB, and
Interference management information.

Different types of eNBs may have different transmit power levels. The transmit power level of eNB X may be sent in the eNB information and may be used by the UEs to estimate pathloss for eNB X. The loading of eNB X may be given by the fraction of resources that are utilized at eNB X, the number of UEs that are served by eNB X, an aggregate data rate required for each link for all UEs served by eNB X, and/or other loading metrics. The achieved data performance of eNB X may be given by an aggregate data rate achieved for each link for all UEs served by eNB X, a percentage of UEs or data flows meeting their data rate and/or quality-of-service (QoS) requirements, an average data rate of the UEs, the data rate of the worst UE, the data rate of the worst 10% UEs, and/or other metrics. The achieved data performance may also be given by QoS metrics, e.g., the fraction of UEs who are not achieving their delay targets. The interference level observed by eNB X may be given for the entire uplink, for each uplink interlace, for each subband, etc. Different uplink interlaces or subbands may have different interference levels due to different sets of UEs transmitting on these interlaces or subbands. The target interference level may also be given for the entire uplink, for each uplink interlace, for each subband, etc. eNB X may serve different UEs on different uplink interlaces or subbands and may provide a target interference level for each uplink interlace or subband used by eNB X.

eNB X may broadcast interference management information, which may be useful for interference management by other eNBs. For example, the interference management information may convey the resources (e.g., the interlaces, subbands, etc.) reserved for use by other eNBs/UEs, the transmit power level on different resources by eNB X, measured interference level and/or target interference level for different resources, etc.

The eNB information may include backhaul quality of eNB X, restricted/unrestricted access status of eNB X, etc. The eNB information may also include the resources used for control channels (or control resources) by eNB X, the primary control resource used by eNB X, etc. The eNB information may also include the number of transmit antennas at eNB X, which may be used to estimate multiple-input multiple-output (MIMO) capacity of eNB X as a serving eNB and/or cooperative (spatial) interference reduction considering eNB X as an interfering eNB.

eNB X may also send UE information such as the average data rate of UEs served by eNB X, the tail (or worst case) data rate of the served UEs, the delay performance (e.g., median or tail) achieved by the served UEs, etc.

eNB X may broadcast the eNB information over the air to the UEs, as shown in FIG. 4. For example, eNB X may send the eNB information on a physical broadcast channel (PBCH) or as part of a system information block (SIB) in LTE. eNB X may also send the eNB information on other channels or signals, e.g., on a channel sent using low reuse, as part of an LRP, etc. Alternatively or additionally, eNB X may send the eNB information via the backhaul to neighbor eNBs.

A given UE Y may send enhanced pilot measurement reports to its serving eNB and possibly to neighbor eNBs. In one design, an enhanced pilot measurement report may include some or all of the following:

A list of eNBs (or cells) detected by the UE,
Pilot measurement for each eNB in the list,
Transmit power level of each eNB,
Pathloss for each eNB,
Loading of each eNB,
Achieved data performance of each eNB,
Interference level observed on the uplink by each eNB,
Target interference level on the uplink for each eNB,
Number and/or priority of reduce interference requests received by the UE from each eNB or all eNBs,
Number of transmit antennas for each eNB, and
UE information.

The list of eNBs included in the enhanced pilot measurement report may include any number of eNBs detected by UE Y. The detected eNBs may include macro eNBs, pico eNBs, and/or femto eNBs. UE Y may report eNBs with receive signal strength exceeding a threshold or eNBs selected in other manners. The reported eNBs may include the serving eNB, neighbor eNBs that may cause high interference to UE Y on the downlink, and neighbor eNBs that may observe high interference from UE Y on the uplink. Each reported eNB may be identified by an eNB identity (ID), a cell ID, an access network ID (ANID), etc. The ANID may be unique or substantially unique across the entire wireless network whereas the eNB ID or cell ID may be unique across a smaller geographic area.

The pathloss from UE Y to each reported eNB may be provided in the enhanced pilot measurement report. The pathloss may also be determined based on received pilot power measured by UE Y for the eNB (which may be provided in the pilot measurement) and the transmit power level of the eNB (which may be obtained from information broadcast by the eNB and provided in the enhanced pilot measurement report).

The neighbor eNBs may send reduce interference requests to UEs within reception range to request the UEs to reduce interference on certain resources. The reduce interference requests may also be referred to as resource utilization messages (RUMs), etc. UE Y may receive reduce interference requests from the neighbor eNBs and may reduce its transmit power accordingly. UE Y may include the number and/or priority of the reduce interference requests received from the neighbor eNBs in the enhanced pilot measurement report. The serving eNB may determine whether the neighbor eNBs are observing high interference based on interference information in the enhanced pilot measurement report. The interference information may include the number and/or priority of the reduce interference requests received by UE Y from the neighbor eNBs, the interference levels observed by the neighbor eNBs, the target interference levels of the neighbor eNBs, etc.

For each reported eNB in the enhanced pilot measurement report, the loading of the eNB, the achieved data performance of the eNB, the interference level observed by the eNB, the target interference level for the eNB, and/or other information may be obtained from the eNB information broadcast by that eNB. Some or all of the eNB information may be sent in the enhanced pilot measurement report.

The enhanced pilot measurement report may also include UE information, which may comprise various types of information regarding UE Y. In one design, the UE information may include some or all of the following:

Achieved data performance of the UE,
Data requirements of the UE,
Interference level observed on the downlink by the UE,
Target interference level on the downlink for the UE,
Number and/or priority of reduce interference requests sent by the UE to each eNB or all eNBs,
Number and/or priority of reduce interference requests received by the UE, and
Number of receive antennas at the UE.

The achieved data performance of UE Y may be given by an overall data rate achieved by UE Y, the number of data flows achieving their data rate and/or QoS requirements, the data rate, median delay, tail delay, delay cumulative distribution function (CDF), etc. for UE Y, and/or other metrics. The data requirements of UE Y may be given by the amount of data to send by UE Y, the QoS of the data to send, etc. The interference level observed by UE Y may be given for the entire downlink, for each downlink interlace, for each subband, etc. Different downlink interlaces or subbands may have different interference levels due to different sets of eNBs transmitting on these interlaces or subbands. The target interference level may also be given for the entire downlink, for each downlink interlace, for each subband, etc. UE Y may send reduce interference requests to neighbor eNBs to request these eNBs to reduce interference on certain resources (e.g., certain interlaces). UE Y may include the number and/or priority of the reduce interference requests sent to the neighbor eNBs in the enhanced pilot measurement reports or via a separate message. The UE information may also include other information that might be useful for interference management by the eNBs and/or scheduling of UE Y. The enhanced pilot measurement report may also include the eNB information described above.

In general, an enhanced pilot measurement report may include pilot measurements for a list of eNBs and may also include eNB information for the reported eNBs and/or UE information. UE Y may periodically send enhanced pilot measurement reports, which may include the same information or different information. For example, some enhanced pilot measurement reports may include eNB information and/or UE information while other enhanced pilot measurement reports may omit eNB information and/or UE information. As another example, some enhanced pilot measurement reports may include interference information for the reported eNBs and/or the UE while other enhanced pilot measurement reports may omit the interference information.

A given eNB Z may receive enhanced pilot measurement reports from UEs served by eNB Z as well as enhanced pilot measurement reports from UEs served by neighbor eNBs. eNB Z may make various interference management decisions based on the enhanced pilot measurement reports received from the UEs.

In one design, eNB Z may select serving eNBs for UEs based on the enhanced pilot measurement reports. For example, eNB Z may be a high-power eNB and may determine whether some UEs served by eNB Z could be better served by low-power eNBs with less cost (e.g., interference) to the wireless network. For a UE being served, eNB Z may determine the pathloss from the UE to eNB Z as well as to each eNB reported by the UE, e.g., based on pilot measurements and the transmit power levels of the reported eNBs. eNB Z may then determine whether the UE has lower pathloss to another eNB and whether the other eNB can serve the UE, e.g., based on the loading and achieved data performance of the other eNB. eNB Z may hand the UE over to the other eNB if the UE can be better served by the other eNB. eNB Z may repeat the process for each UE served by eNB Z, or for each UE served by eNB Z and having poor data performance, or for each UE served by eNB Z and observing high interference from other eNBs, etc.

In another design, eNB Z may avoid scheduling a UE on certain resources on the uplink (e.g., an uplink interlace) that will cause high interference to a neighbor eNB. eNB Z may be a high-power eNB, e.g., a macro eNB. The UE may be located far from eNB Z and may need to transmit at high power in order to reach eNB Z. The UE may then cause high interference to the neighbor eNB, which may be a pico or femto eNB. eNB Z may determine the interference caused by the UE to the neighbor eNB based on the transmit power level of the UE (which may be known by eNB Z or provided in the enhanced pilot measurement report sent by the UE) and the pathloss from the UE to the neighbor eNB (which may be determined based on information included in the enhanced pilot measurement report). eNB Z may also know the target interference level of the neighbor eNB and the achieved data performance of the neighbor eNB (e.g., based on eNB information in the enhanced pilot measurement report). Based on the available information, eNB Z may choose to not schedule the UE on resources (e.g., one or more interlaces or subbands) used by the neighbor eNB. The neighbor eNB may then observe lower interference on these resources as compared to other resources and may be able to achieve better performance.

In another design, eNB Z may reserve resources for one or more neighbor eNBs based on data performance of the neighbor eNBs, which may be obtained from the enhanced pilot measurement reports. The reserved resources may be given by one or more interlaces, one or more subbands, or some other radio resources. eNB Z may be a high-power eNB and may determine whether low-power eNBs (or UEs connected to the low-power eNBs) are achieving sufficient data performance compared to the UEs served by eNB Z. Based on this information, eNB Z may determine whether it can improve its own performance or the performance of the low-power eNBs or the network performance in general. For example, eNB Z may reserve one or more downlink interlaces and/or one or more uplink interlaces for use by the low-power eNBs. eNB Z may reduce its transmit power or avoid transmission on the reserved interlace(s) to cause less or no interference on the reserved interlace(s). The low-power eNBs may be able to better serve their UEs on the reserved interlace(s). eNB Z may also hand over certain UEs to the low-power eNBs, which may be able to serve these UEs on the reserved interlace(s).

In another design, eNB Z may reserve uplink resources (e.g., one or more uplink interlaces, one or more subbands, etc.) for neighbor eNBs if the neighbor eNBs observe high interference on the uplink from the UEs served by eNB Z. This condition may occur if the UEs are located far from eNB Z (which may be a high-power eNB or an eNB with unrestricted access) and are closer to the neighbor eNBs (which may be low-power eNBs or eNBs with restricted access). eNB Z may detect this condition based on (i) high interference levels observed by the neighbor eNBs and/or (ii) the number and/or priority of reduce interference requests received by the UEs served by eNB Z from the neighbor eNBs. By reserving uplink resources for use by the neighbor eNBs, the performance of these eNBs may improve and the number and/or priority of reduce interference requests sent by these eNBs may also reduce.

In another design, eNB Z may reserve downlink resources (e.g., one or more downlink interlaces, one or more subbands, etc.) for neighbor eNBs if the UEs served by the neighbor eNBs observe high interference on the downlink from eNB Z. This condition may occur if (i) eNB Z is a high-power eNB and the neighbor eNBs are low-power eNBs or (ii) eNB Z is a femto eNB with restricted access and the neighbor eNBs are macro and/or pico eNBs with restricted access. eNB Z may detect this condition based on (i) high interference levels observed by the UEs served by the neighbor eNBs and/or (ii) the number and/or priority of reduce interference requests received by eNB Z from the UEs served by the neighbor eNBs. eNB Z may also consider the performance of the neighbor eNBs and/or their UEs in comparison to the performance of eNB Z and/or its UEs. eNB Z may reserve resources if eNB Z detects an improvement in network performance and/or fairness as a whole. eNB Z may also take into account handoff decisions when determining whether to reserve resources. For example, eNB Z may hand over two UEs to two pico eNBs and may simultaneously reserve some resources for these eNBs. The two pico eNBs may then be able to serve the two UEs simultaneously on the same resources, thereby achieving cell-splitting gains. In any case, by reserving downlink resources for use by the neighbor eNBs, the performance of these eNBs may improve and the number and/or priority of reduce interference requests sent by their UEs may also reduce.

eNB Z may reserve downlink and/or uplink resources based on a predetermined order of reserving resources. For example, eNB Z may reserve interlaces or subbands based on a predetermined order. The predetermined order may be applicable for different eNBs and may allow high-power eNBs to reserve an overlapping resources for use by low-power eNBs and/or their UEs.

eNB Z may or may not convey the reserved downlink and/or uplink resources to the neighbor eNBs and the UEs. In one design, eNB Z may advertise the reserved downlink and/or uplink resources. eNB Z may also advertised separately the reserved resources for data and the reserved resources for control channels. Different transmit power and/or interference control rules may be used on the resources used for data and control channels. In another design, eNB Z does not convey the reserved resources. A neighbor eNB may not be aware of which resources have been reserved by eNB Z for the neighbor eNB and may simply observe lower interference on the reserved resources.

eNB Z may also make other interference management decisions based on the enhanced pilot measurement reports received from the UEs.

FIG. 5 shows a design of a process 500 performed by a first base station, which may be an eNB or some other station in a wireless network. The first base station may send a pilot (e.g., a low reuse pilot) for use by UEs to detect the first base station (block 512). The first base station may also send a broadcast transmission comprising information for the first base station, which may include any of the eNB information described above (514).

The first base station may receive enhanced pilot measurement reports from a plurality of UEs (block 516). Each enhanced pilot measurement report may include pilot measurements for a set of base stations and may further include information for the base stations in the set and/or information for the UE sending the enhanced pilot measurement report. A pilot measurement for a base station may include received signal strength, received pilot power, received signal quality, and/or other information. In one design, each enhanced pilot measurement report may include the transmit power level of each base station in the set of base stations being reported, the pathloss for each base station, the loading of each base station, the achieved data performance of each base station, the interference level observed by each base station, the target interference level for each base station, and/or other information. In one design, each enhanced pilot measurement report may include the achieved data performance of the UE sending the report, the data requirements of the UE, the interference level observed by the UE, the target interference level for the UE, and/or other information.

The first base station may make an interference management decision based on the enhanced pilot measurement reports received from the plurality of UEs (block 518). In one design of block 518, the first base station may select a serving base station for a UE based on an enhanced pilot measurement report received from the UE. For example, the first base station may select a high-power base station or a low-power base station to serve the UE based on the enhanced pilot measurement report. The first base station may also select the serving base station for the UE based on the pathloss from the UE to each base station in the set of base stations included in the enhanced pilot measurement report. The first base station may determine the pathloss from the UE to each base station based on the transmit power level of the base station (which may be obtained from the report) and the received power level of the base station at the UE (which may be obtained from a pilot measurement included in the report). The first base station may also select the serving base station for the UE in other manners. The first base station may hand the UE over to the selected base station if it is different from the first base station.

In another design of block 518, the first base station may determine resources with high observed interference or a low target interference level at a second/neighbor base station based on the enhanced pilot measurement reports. The resources may comprise time-frequency resources, interlaces, subbands, etc. The first base station may avoid scheduling a UE for uplink transmission on the resources in order to reduce interference to the second base station.

In yet another design of block 518, the first base station may determine whether to reserve resources (e.g., downlink and/or uplink interlaces, subbands, etc.) for neighbor base stations and/or UEs served by these base stations based on the enhanced pilot measurement reports. In one design, the first base station may determine data performance of the second base station based on the enhanced pilot measurement reports. The first base station may then determine whether to reserve resources for the second base station based on the data performance of the second base station and the data performance of the first base station. In another design, the first base station may determine whether the second base station observes high interference from the UEs served by the first base station based on the enhanced pilot measurement reports. The first base station may then reserve resources on the uplink for the second base station if it observes high interference from the UEs served by the first base station. In yet another design, the first base station may determine whether the UEs served by the second base station observe high interference from the first base station based on the enhanced pilot measurement reports. The first base station may then reserve resources on the downlink for the second base station if its UEs observe high interference from the first base station. In one design, the first base station may broadcast the reserved resources for the second base station to UEs within reception range of the first base station. In another design, the first base station does not advertise the reserved resources for the second base station.

The first base station may also make other interference management decisions based on the enhanced pilot measurement reports. For example, the first base station may determine its transmit power level (e.g., for each interlace or each subband) based on the enhanced pilot measurement reports in order to reduce interference to neighbor base stations.

FIG. 6 shows a design of an apparatus 600 for a base station. Apparatus 600 includes a module 612 to send a pilot from the base station for use by UEs to detect the base station, a module 614 to send a broadcast transmission comprising information for the base station, a module 616 to receive enhanced pilot measurement reports from a plurality of UEs, and a module 618 to make an interference management decision based on the enhanced pilot measurement reports.

FIG. 7 shows a design of a process 700 performed by a UE in a wireless network. The UE may detect for base stations/eNBs based on pilots (e.g., low reuse pilots) transmitted by the base stations (block 712). The UE may receive broadcast transmissions from the detected base stations and may obtain information for the base stations from the broadcast transmissions (block 714). The information for the base stations may include any of the eNB information described above.

The UE may generate an enhanced pilot measurement report, which may include pilot measurements for a set of base stations detected by the UE and may further include information for the base stations in the set and/or information for the UE (block 716). In one design, the enhanced pilot measurement report may include the transmit power level of each base station in the set, the pathloss for each base station, the loading of each base station, the achieved data performance of each base station, the interference level observed by each base station, the target interference level for each base station, and/or other information. In one design, the enhanced pilot measurement report may include the achieved data performance of the UE, the data requirements of the UE, the interference level observed by the UE, the target interference level for the UE, and/or other information.

The UE may send the enhanced pilot measurement report to at least one base station in the set for use by the at least one base station to make interference management decisions (block 718). The at least one base station may include a serving base station for the UE, base stations causing high interference to the UE on downlink, base stations observing high interference from the UE on uplink, and/or other base stations. The UE may communicate with a base station selected for the UE based on the enhanced pilot measurement report (block 720). This base station may be selected based on pathloss, data performance and/or other criteria determined based on the information included in the enhanced pilot measurement report.

In another design, the UE may send different types of information (e.g., pilot measurements, interference information, interference management information, eNB information, UE information, etc.) in different messages instead of in the enhanced pilot measurement report. In general, any number of messages may be used to send different types of information, and each message may carry any type of information.

Each base station may obtain different types of information via different messages from the UE and may use the different types of information as described above.

FIG. 8 shows a design of an apparatus 800 for a UE. Apparatus 800 includes a module 812 to detect for base stations based on pilots transmitted by the base stations, a module 814 to receive broadcast transmissions from the detected base stations and obtain information for the base stations, a module 816 to generate an enhanced pilot measurement report including pilot measurements for a set of base stations detected by the UE and further including information for the base stations in the set and/or information for the UE, a module 818 to send the enhanced pilot measurement report to at least one base station in the set for use by the at least one base station to make interference management decisions, and a module 820 to communicate with a base station selected for the UE based on the enhanced pilot measurement report.

The modules in FIGS. 6 and 8 may comprise processors, electronics devices, hardware devices, electronics components, logical circuits, memories, software codes, firmware codes, etc., or any combination thereof.

Figure 9:
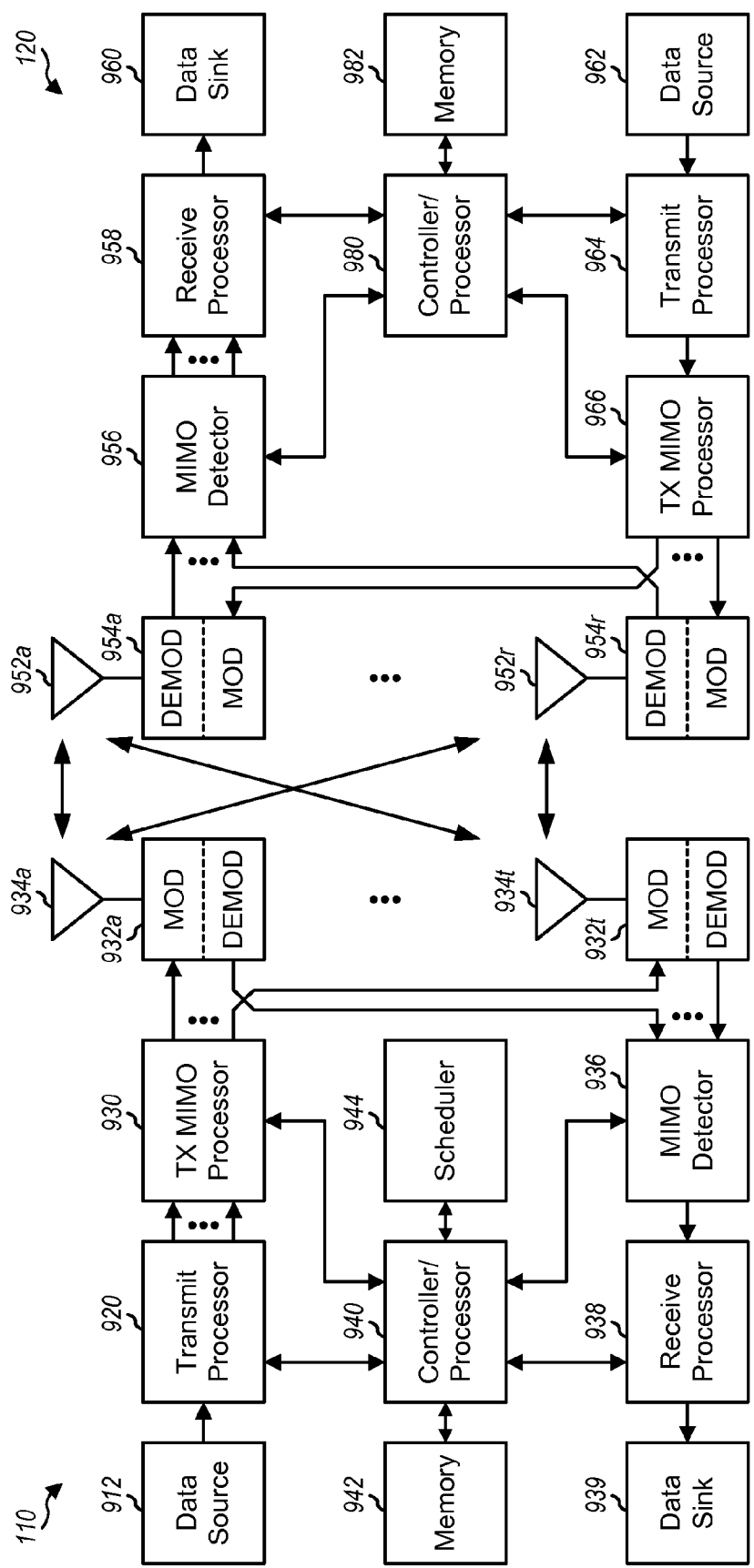
FIG. 9 shows a block diagram of a base station and a UE.

FIG. 9 shows a block diagram of a design of a base station/eNB 110 and a UE 120, which may be one of the base stations/eNBs and one of the UEs in FIG. 1. In this design, base station 110 is equipped with T antennas 934a through 934t, and UE 120 is equipped with R antennas 952a through 952r, where in general T≥1 and R≥1.

At base station 110, a transmit processor 920 may receive data for one or more UEs from a data source 912, process (e.g., encode, interleave, and modulate) the data, and provide data symbols. Transmit processor 920 may also receive information (e.g., control information, eNB information, reduce interference requests, etc.) from a controller/processor 940, process the information, and provide control symbols. A transmit (TX) MIMO processor 930 may perform spatial processing (e.g., preceding) on the data symbols, the control symbols, and/or pilot symbols, if applicable, and may provide T output symbol streams to T modulators (MODs) 932a through 932t. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink signal. T downlink signals from modulators 932a through 932t may be transmitted via T antennas 934a through 934t, respectively.

At UE 120, antennas 952a through 952r may receive the downlink signals from base station 110 and may provide received signals to demodulators (DEMODs) 954a through 954r, respectively. Each demodulator 954 may condition (e.g., filter, amplify, downconvert, and digitize) a respective received signal to obtain received samples. Each demodulator 954 may further process the received samples (e.g., for OFDM, etc.) to obtain received symbols. A MIMO detector 956 may obtain received symbols from all R demodulators 954a through 954r, perform MIMO detection on the received symbols if applicable, and provide detected symbols. A receive processor 958 may process (e.g., demodulate, deinterleave, and decode) the detected symbols, provide decoded data for UE 120 to a data sink 960, and provide decoded information to a controller/processor 980.

On the uplink, at UE 120, a transmit processor 964 may receive and process data from a data source 962 and information (e.g., for enhanced pilot measurement reports, reduce interference requests, etc.) from controller/processor 980. The symbols from transmit processor 964 may be precoded by a TX MIMO processor 966 if applicable, further processed by modulators 954a through 954r, and transmitted to base station 110. At base station 110, the uplink signals from UE 120 may be received by antennas 934, processed by demodulators 932, detected by a MIMO detector 936 if applicable, and further processed by a receive processor 938 to obtain the data and information sent by UE 120.

Controllers/processors 940 and 980 may direct the operation at base station 110 and UE 120, respectively. Processor 940 and/or other processors and modules at base station 110 may perform or direct process 500 in FIG. 5 and/or other processes for the techniques described herein. Processor 980 and/or other processors and modules at UE 120 may perform or direct process 700 in FIG. 7 and/or other processes for the techniques described herein. Memories 942 and 982 may store data and program codes for base station 110 and UE 120, respectively. A scheduler 944 may schedule UEs for data transmission on the downlink and uplink and may provide resource grants for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving enhanced pilot measurement reports from a plurality of user equipments at a first base station, each enhanced pilot measurement report including pilot measurements for a set of base stations and further including base station information broadcast by base stations in the set of base stations; and
   making a decision relating to resource allocation, or scheduling, or both affecting at least one of the plurality of user equipments based on the pilot measurements and the base station information in the received enhanced pilot measurement reports.

2. The method of claim 1, wherein the base station information in each enhanced pilot measurement report includes at least one of a transmit power level of each base station in the set of base stations, pathloss for each base station, loading of each base station, achieved data performance of each base station, an interference level observed by each base station, or a target interference level for each base station.

3. The method of claim 1, wherein each enhanced pilot measurement report further includes at least one of achieved data performance of a user equipment sending the enhanced pilot measurement report, data requirements of a user equipment, an interference level observed by the user equipment, or a target interference level for the user equipment.

4. The method of claim 1, further comprising:
   selecting a high-power base station or a low-power base station to serve a user equipment based on an enhanced pilot measurement report received from the user equipment.

5. The method of claim 1, further comprising:
   determining pathloss from a user equipment to each base station in a set of base stations included in an enhanced pilot measurement report received from the user equipment, and
   selecting one base station in the set of base stations to serve the user equipment based on the pathloss for each base station in the set of base stations.

6. The method of claim 5, wherein the determining the pathloss from the user equipment to each base station comprises
   obtaining a transmit power level of the base station from the enhanced pilot measurement report,
   obtaining a received power level of the base station at the user equipment from the enhanced pilot measurement report, and
   determining the pathloss from the user equipment to the base station based on the transmit power level and the received power level of the base station.

7. The method of claim 1, wherein the making a decision comprises
   determining resources with a low target interference level on uplink at a second base station based on the enhanced pilot measurement reports, and
   avoiding scheduling a user equipment for uplink transmission on the resources to reduce interference to the second base station.

8. The method of claim 1, wherein the making a decision comprises determining whether to reserve resources for a second base station based on the enhanced pilot measurement reports.

9. The method of claim 8, wherein the reserved resources comprise at least one interlace on uplink, or at least one subband on the uplink, or at least one interlace on downlink, or at least one subband on the downlink, or a combination thereof.

10. The method of claim 8, further comprising:
    broadcasting the reserved resources for the second base station to user equipments within reception range of the first base station.

11. The method of claim 1, wherein the making a decision comprises
    determining whether a second base station observes high interference from user equipments served by the first base station based on the enhanced pilot measurement reports, and
    reserving resources on uplink for the second base station if the second base station observes high interference from the user equipments served by the first base station.

12. The method of claim 1, wherein the making a decision comprises
    determining whether user equipments served by a second base station observe high interference from the first base station based on the enhanced pilot measurement reports, and reserving resources on downlink for the second base station if the user equipments served by the second base station observe high interference from the first base station.

13. The method of claim 1, wherein the making a decision comprises
determining data performance of a second base station based on the enhanced pilot measurement reports, and
determining whether to reserve resources for the second base station based on the data performance of the second base station and data performance of the first base station.

14. The method of claim 1, wherein the making a decision comprises determining a transmit power level of the first base station based on the enhanced pilot measurement report.

15. The method of claim 1, further comprising:
sending a broadcast transmission comprising information for the first base station, the information for the first base station being used for enhanced pilot measurement reports sent by user equipments detecting the first base station.

16. The method of claim 1, further comprising:
sending a low reuse pilot from the first base station for use by user equipments to detect the first base station.

17. An apparatus for wireless communication, comprising:
at least one processor configured to:
receive enhanced pilot measurement reports from a plurality of user equipments at a first base station, each enhanced pilot measurement report including pilot measurements for a set of base stations and further including base station information broadcast by base stations in the set of base stations, and
make a decision relating to resource allocation, or scheduling, or both affecting at least one of the plurality of user equipments based on the pilot measurements and the base station information in the received enhanced pilot measurement reports.

18. The apparatus of claim 17, wherein the at least one processor is configured to determine pathloss from a user equipment to each base station in a set of base stations included in an enhanced pilot measurement report received from the user equipment, and to select one base station in the set of base stations to serve the user equipment based on the pathloss for each base station in the set of base stations.

19. The apparatus of claim 17, wherein the at least one processor is configured to determine resources with a low target interference level on uplink at a second base station based on the enhanced pilot measurement reports, and to avoid scheduling a user equipment for uplink transmission on the resources to reduce interference to the second base station.

20. The apparatus of claim 17, wherein the at least one processor is configured to determine whether to reserve resources for a second base station based on the enhanced pilot measurement reports.

21. An apparatus for wireless communication, comprising:
means for receiving enhanced pilot measurement reports from a plurality of user equipments at a first base station, each enhanced pilot measurement report including pilot measurements for a set of base stations and further including base station information broadcast by base stations in the set of base stations; and
means for making a decision relating to resource allocation, or scheduling, or both affecting at least one of the plurality of user equipments based on the pilot measurements and the base station information in the received enhanced pilot measurement reports.

22. The apparatus of claim 21, further comprising:
means for determining pathloss from a user equipment to each base station in a set of base stations included in an enhanced pilot measurement report received from the user equipment, and
means for selecting one base station in the set of base stations to serve the user equipment based on the pathloss for each base station in the set of base stations.

23. The apparatus of claim 21, wherein the means for making a decision comprises
means for determining resources with a low target interference level on uplink at a second base station based on the enhanced pilot measurement reports, and
means for avoiding scheduling a user equipment for uplink transmission on the resources to reduce interference to the second base station.

24. The apparatus of claim 21, wherein the means for making a decision comprises means for determining whether to reserve resources for a second base station based on the enhanced pilot measurement reports.

25. A computer program product, comprising:
a non-transitory computer-readable medium comprising:
code for causing at least one computer to receive enhanced pilot measurement reports from a plurality of user equipments at a first base station, each enhanced pilot measurement report including pilot measurements for a set of base stations and further including base station information broadcast by base stations in the set of base stations, and
code for causing the at least one computer to make a decision relating to resource allocation, or scheduling, or both affecting at least one of the plurality of user equipments based on the pilot measurements and the base station information in the received enhanced pilot measurement reports.

26. A method for wireless communication, comprising:
generating an enhanced pilot measurement report including pilot measurements for a set of base stations detected by a user equipment and further including base station information broadcast by base stations in the set of base stations; and
sending the enhanced pilot measurement report to at least one base station in the set of base stations for use to make decisions relating to resource allocation, or scheduling, or both affecting at least one user equipment based on the pilot measurements and the base station information in the enhanced pilot measurement report.

27. The method of claim 26, further comprising:
receiving broadcast transmissions from the base stations in the set of base stations; and
obtaining the base station information from the broadcast transmissions.

28. The method of claim 26, wherein the enhanced pilot measurement report includes at least one of a transmit power level of each base station in the set of base stations, pathloss for each base station, loading of each base station, achieved data performance of each base station, an interference level observed by each base station, or a target interference level for each base station.

29. The method of claim 26, wherein the base station information in the enhanced pilot measurement report includes at least one of achieved data performance of the user equipment, data requirements of the user equipment, an interference level observed by the user equipment, or a target interference level for the user equipment.

30. The method of claim 26, further comprising:
communicating with a serving base station selected for the user equipment based on the enhanced pilot measurement report.

31. The method of claim 30, wherein the serving base station is selected based on pathloss or data performance determined based on the enhanced pilot measurement report.

32. The method of claim 26, wherein the at least one base station comprises at least one of a serving base station for the user equipment, base stations causing high interference to the user equipment on downlink, or base stations observing high interference from the user equipment on uplink.

33. An apparatus for wireless communication, comprising:
at least one processor configured to:
generate an enhanced pilot measurement report including pilot measurements for a set of base stations detected by a user equipment and further including base station information broadcast by base stations in the set of base stations, and
send the enhanced pilot measurement report to at least one base station in the set of base stations for use to make decisions relating to resource allocation, or scheduling, or both affecting at least one user equipment based on the pilot measurements and the base station information in the enhanced pilot measurement report.

34. The apparatus of claim 33, wherein the at least one processor is configured to receive broadcast transmissions from the base stations in the set of base stations, and to obtain the base station information from the broadcast transmissions.

35. The apparatus of claim 33, wherein the at least one processor is configured to communicate with a serving base station selected for the user equipment based on the enhanced pilot measurement report.

* * * * *